United States Patent
Murase et al.

(10) Patent No.: US 11,673,984 B2
(45) Date of Patent: Jun. 13, 2023

(54) BINDER COMPOSITION FOR NON-AQUEOUS SECONDARY BATTERY ELECTRODE, CONDUCTIVE MATERIAL PASTE COMPOSITION FOR NON-AQUEOUS SECONDARY BATTERY ELECTRODE, SLURRY COMPOSITION FOR NON-AQUEOUS SECONDARY BATTERY ELECTRODE, ELECTRODE FOR NON-AQUEOUS SECONDARY BATTERY, AND NON-AQUEOUS SECONDARY BATTERY

(71) Applicant: ZEON CORPORATION, Tokyo (JP)

(72) Inventors: Tomoya Murase, Tokyo (JP); Taku Matsumura, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 320 days.

(21) Appl. No.: 16/971,684

(22) PCT Filed: Mar. 14, 2019

(86) PCT No.: PCT/JP2019/010634
§ 371 (c)(1),
(2) Date: Aug. 21, 2020

(87) PCT Pub. No.: WO2019/181744
PCT Pub. Date: Sep. 26, 2019

(65) Prior Publication Data
US 2020/0411868 A1 Dec. 31, 2020

(30) Foreign Application Priority Data
Mar. 23, 2018 (JP) .............................. JP2018-056427

(51) Int. Cl.
| | | |
|---|---|---|
| C08F 212/08 | (2006.01) | |
| H01M 4/62 | (2006.01) | |
| C08F 220/18 | (2006.01) | |
| C08L 101/02 | (2006.01) | |
| H01M 4/04 | (2006.01) | |
| H01M 4/139 | (2010.01) | |
| H01M 10/0525 | (2010.01) | |
| H01M 10/0568 | (2010.01) | |
| H01M 10/0569 | (2010.01) | |
| H01M 50/491 | (2021.01) | |
| H01M 50/489 | (2021.01) | |
| H01M 4/02 | (2006.01) | |

(52) U.S. Cl.
CPC .......... *C08F 220/18* (2013.01); *C08F 212/08* (2013.01); *C08L 101/025* (2013.01); *H01M 4/0404* (2013.01); *H01M 4/139* (2013.01); *H01M 4/622* (2013.01); *H01M 10/0525* (2013.01); *H01M 10/0568* (2013.01); *H01M 10/0569* (2013.01); *H01M 50/489* (2021.01); *H01M 50/491* (2021.01); *H01M 2004/027* (2013.01); *H01M 2004/028* (2013.01); *H01M 2300/002* (2013.01)

(58) Field of Classification Search
CPC .... C08F 212/08; C08F 220/18; C08F 220/30; C08F 220/64
See application file for complete search history.

(56) References Cited

U.S. PATENT DOCUMENTS

| | | | | |
|---|---|---|---|---|
| 8,092,981 B2 * | 1/2012 | Kang | ................. | H01L 27/1288 430/910 |
| 2013/0330622 A1 | 12/2013 | Sasaki | | |
| 2014/0154562 A1 | 6/2014 | Fukuchi | | |
| 2019/0058194 A1 | 2/2019 | Matsumura | | |

FOREIGN PATENT DOCUMENTS

| | | | | |
|---|---|---|---|---|
| CN | 101256360 B | * | 6/2012 | ............ C08F 220/32 |
| EP | 3425707 A1 | | 1/2019 | |
| JP | 2012204303 A | | 10/2012 | |
| JP | 2014110234 A | | 6/2014 | |
| JP | 2017143027 A | | 8/2017 | |
| WO | WO-9509876 A1 | * | 4/1995 | ............ C08F 220/12 |
| WO | 2012115096 A1 | | 8/2012 | |
| WO | 2017150048 A1 | | 9/2017 | |

OTHER PUBLICATIONS

Machine translation of WO 2017/150048 (no date).*
Dec. 22, 2021, the Extended European Search Report issued by the European Patent Office in the corresponding European Patent Application No. 19771270.6.
J. Warnant et al., Physicochemical properties of pH-controlled polyion complex (PIC) micelles of poly(acrylic acid)-based double hydrophilic block copolymers and various polyamines, Analytical and Bioanalytical Chemistry, 2012, pp. 1395-1404, vol. 403.
Apr. 16, 2019, International Search Report issued in the International Patent Application No. PCT/JP2019/010634.
Sep. 29, 2020, International Preliminary Reporton Patentability issued in the International Patent Application No. PCT/JP2019/010634.

* cited by examiner

Primary Examiner — Amanda C. Walke
(74) Attorney, Agent, or Firm — Kenja IP Law PC

(57) ABSTRACT

Provided is a binder composition for a non-aqueous secondary battery electrode that can form a slurry composition for a non-aqueous secondary battery electrode having excellent viscosity stability and a non-aqueous secondary battery having excellent cycle characteristics. The binder composition for a non-aqueous secondary battery electrode contains: a polymer that includes a monomer unit including a functional group that is bondable with a cationic group and a (meth)acrylic acid ester monomer unit; and an organic compound that includes at least two cationic groups. The binder composition for a non-aqueous secondary battery electrode has a viscosity change rate of 400% or less when left at rest at a temperature of 60° C. for 30 days.

9 Claims, No Drawings

BINDER COMPOSITION FOR NON-AQUEOUS SECONDARY BATTERY ELECTRODE, CONDUCTIVE MATERIAL PASTE COMPOSITION FOR NON-AQUEOUS SECONDARY BATTERY ELECTRODE, SLURRY COMPOSITION FOR NON-AQUEOUS SECONDARY BATTERY ELECTRODE, ELECTRODE FOR NON-AQUEOUS SECONDARY BATTERY, AND NON-AQUEOUS SECONDARY BATTERY

TECHNICAL FIELD

The present disclosure relates to a binder composition for a non-aqueous secondary battery electrode, a conductive material paste composition for a non-aqueous secondary battery electrode, a slurry composition for a non-aqueous secondary battery electrode, an electrode for a non-aqueous secondary battery, and a non-aqueous secondary battery.

BACKGROUND

Non-aqueous secondary batteries (hereinafter, also referred to simply as "secondary batteries") such as lithium ion secondary batteries have characteristics such as compact size, light weight, high energy-density, and the ability to be repeatedly charged and discharged, and are used in a wide variety of applications. Consequently, in recent years, studies have been made to improve battery members such as electrodes for the purpose of achieving even higher non-aqueous secondary battery performance.

An electrode used in a secondary battery such as a lithium ion secondary battery normally includes a current collector and an electrode mixed material layer (positive electrode mixed material layer or negative electrode mixed material layer) formed on the current collector. This electrode mixed material layer is formed by, for example, applying a slurry composition containing an electrode active material, a binder-containing binder composition, and so forth onto the current collector, and then drying the applied slurry composition.

In order to further improve the performance of secondary batteries, attempts have been made in recent years to improve binder compositions used in electrode mixed material layer formation.

In one specific example, Patent Literature (PTL) 1 proposes a binder composition that contains a polymer including a functional group that is bondable with a cationic group and an organic compound including at least two cationic groups as a binder composition for a non-aqueous secondary battery electrode that has excellent viscosity stability and that can form an electrode mixed material layer having excellent electrolyte solution resistance.

CITATION LIST

Patent Literature

PTL 1: WO2017/150048A1

SUMMARY

Technical Problem

However, there is room for improvement of the conventional binder composition described above in terms of improving viscosity stability of a slurry composition for a non-aqueous secondary battery electrode that is produced using the binder composition and improving cycle characteristics of a non-aqueous secondary battery that is produced using the binder composition.

Accordingly, one object of the present disclosure is to provide a binder composition for a non-aqueous secondary battery electrode and a conductive material paste composition for a non-aqueous secondary battery electrode that can form a slurry composition for a non-aqueous secondary battery electrode having excellent viscosity stability and a non-aqueous secondary battery having excellent cycle characteristics.

Another object of the present disclosure is to provide a slurry composition for a non-aqueous secondary battery electrode that has excellent viscosity stability and that can form a non-aqueous secondary battery having excellent cycle characteristics.

Yet another object of the present disclosure is to provide an electrode for a non-aqueous secondary battery that can form a non-aqueous secondary battery having excellent cycle characteristics, and also to provide a non-aqueous secondary battery that has excellent cycle characteristics.

Solution to Problem

The inventors conducted diligent investigation with the aim of solving the problems set forth above. The inventors discovered that a slurry composition for a non-aqueous secondary battery electrode having excellent viscosity stability and a non-aqueous secondary battery having excellent cycle characteristics are obtained by using a binder composition that contains a polymer having a specific chemical composition and an organic compound including at least two cationic groups, and that has a viscosity change rate within a specific range. In this manner, the inventors completed the present disclosure.

Specifically, the present disclosure aims to advantageously solve the problems set forth above, and a presently disclosed binder composition for a non-aqueous secondary battery electrode comprises: a polymer that includes a monomer unit including a functional group that is bondable with a cationic group and a (meth)acrylic acid ester monomer unit; and an organic compound that includes at least two cationic groups, wherein the binder composition for a non-aqueous secondary battery electrode has a viscosity change rate of 400% or less when left at rest at a temperature of 60° C. for 30 days. Through inclusion of a polymer that includes a monomer unit including a functional group that is bondable with a cationic group and a (meth)acrylic acid ester monomer unit and an organic compound that includes at least two cationic groups in a binder composition for a non-aqueous secondary battery electrode, and through the viscosity change rate of the binder composition for a non-aqueous secondary battery electrode being not more than a specific value in this manner, it is possible to form a slurry composition for a non-aqueous secondary battery electrode having excellent viscosity stability and a secondary battery having excellent cycle characteristics.

In the present disclosure, "(meth)acryl" is used to indicate "acryl" and/or "methacryl". Moreover, the "viscosity change rate" referred to in the present disclosure can be measured by a method described in the EXAMPLES section.

In the presently disclosed binder composition for a non-aqueous secondary battery electrode, the polymer preferably includes the monomer unit including a functional group that is bondable with a cationic group in a proportion of not less than 0.1 mass % and not more than 10 mass %. In addition to improving viscosity stability of a slurry composition and cycle characteristics of a secondary battery, it is also possible to improve electrolyte solution resistance (tendency to not elute into electrolyte solution) of an electrode mixed material layer formed using the binder composition and lower internal resistance of a secondary battery when the proportional content of the monomer unit including a functional group that is bondable with a cationic group is within the range set forth above. Viscosity stability of the binder composition can also be increased.

Note that the "proportional content of a monomer unit" referred to in the present disclosure can be measured by a nuclear magnetic resonance (NMR) method such as $^1$H-NMR.

In the presently disclosed binder composition for a non-aqueous secondary battery electrode, the polymer preferably further includes an aromatic vinyl monomer unit. When the polymer further includes an aromatic vinyl monomer unit, viscosity stability of a slurry composition and cycle characteristics of a secondary battery can be further improved, and internal resistance of a secondary battery can be lowered.

In the presently disclosed binder composition for a non-aqueous secondary battery electrode, the polymer preferably includes the aromatic vinyl monomer unit in a proportion of not less than 20 mass % and not more than 40 mass %. In addition to improving viscosity stability of a slurry composition and cycle characteristics of a secondary battery, it is also possible to improve electrolyte solution resistance of an electrode mixed material layer formed using the binder composition and lower internal resistance of a secondary battery when the proportional content of the aromatic vinyl monomer unit is within the range set forth above.

In the presently disclosed binder composition for a non-aqueous secondary battery electrode, the polymer preferably includes the (meth)acrylic acid ester monomer unit in a proportion of not less than 40 mass % and not more than 80 mass %. In addition to improving viscosity stability of a slurry composition and cycle characteristics of a secondary battery, it is also possible to improve electrolyte solution resistance of an electrode mixed material layer formed using the binder composition and lower internal resistance of a secondary battery when the proportional content of the (meth)acrylic acid ester monomer unit is within the range set forth above.

In the presently disclosed binder composition for a non-aqueous secondary battery electrode, the cationic groups of the organic compound are preferably unsubstituted amino groups. By using an organic compound that includes unsubstituted amino groups as cationic groups, it is possible to improve electrolyte solution resistance of an electrode mixed material layer formed using the binder composition.

In the presently disclosed binder composition for a non-aqueous secondary battery electrode, the organic compound preferably has a molecular weight of not less than 100 and not more than 1,000. In addition to improving viscosity stability of a slurry composition and cycle characteristics of a secondary battery, it is also possible to improve electrolyte solution resistance of an electrode mixed material layer formed using the binder composition and lower internal resistance of a secondary battery when the molecular weight of the organic compound is within the range set forth above. Viscosity stability of the binder composition can also be increased.

In a case in which the organic compound is a polymer, the molecular weight of the polymer can be determined as a polystyrene-equivalent weight-average molecular weight measured by gel permeation chromatography (developing solvent: tetrahydrofuran).

In the presently disclosed binder composition for a non-aqueous secondary battery electrode, the polymer preferably has a weight-average molecular weight of 250,000 or less. When the weight-average molecular weight of the polymer is not more than the upper limit set forth above, viscosity stability of the binder composition, viscosity stability of a slurry composition, and cycle characteristics of a secondary battery can be improved, and internal resistance of a secondary battery can be lowered.

Note that the "weight-average molecular weight" of a polymer referred to in the present disclosure can be measured by gel permeation chromatography (GPC).

Moreover, the present disclosure aims to advantageously solve the problems set forth above, and a presently disclosed conductive material paste composition for a non-aqueous secondary battery electrode comprises: a conductive material; and any one of the binder compositions for a non-aqueous secondary battery electrode set forth above. By using a conductive material paste composition that contains a conductive material and any one of the binder compositions set forth above, it is possible to form a slurry composition for a non-aqueous secondary battery electrode having excellent viscosity stability and a secondary battery having excellent cycle characteristics.

Furthermore, the present disclosure aims to advantageously solve the problems set forth above, and a presently disclosed slurry composition for a non-aqueous secondary battery electrode comprises: an electrode active material; and any one of the binder compositions for a non-aqueous secondary battery electrode set forth above. Through inclusion of an electrode active material and the binder composition set forth above in this manner, it is possible to obtain a slurry composition that has excellent viscosity stability and that can form a secondary battery having excellent cycle characteristics.

Also, the present disclosure aims to advantageously solve the problems set forth above, and a presently disclosed electrode for a non-aqueous secondary battery comprises an electrode mixed material layer formed using the slurry composition for a non-aqueous secondary battery electrode set forth above. By using the slurry composition set forth above to form an electrode mixed material layer in this manner, an electrode that can form a secondary battery having excellent cycle characteristics is obtained.

Moreover, the present disclosure aims to advantageously solve the problems set forth above, and a presently disclosed non-aqueous secondary battery comprises a positive electrode, a negative electrode, an electrolyte solution, and a separator, wherein at least one of the positive electrode and the negative electrode is the electrode for a non-aqueous secondary battery set forth above. By using the electrode set forth above as at least one of the positive electrode and the negative electrode in this manner, the secondary battery can be caused to display excellent cycle characteristics.

Advantageous Effect

According to the present disclosure, a binder composition for a non-aqueous secondary battery electrode and a conductive material paste composition for a non-aqueous secondary battery electrode that can form a slurry composition for a non-aqueous secondary battery electrode having excellent viscosity stability and a non-aqueous secondary battery having excellent cycle characteristics are obtained.

Moreover, according to the present disclosure, a slurry composition for a non-aqueous secondary battery electrode that has excellent viscosity stability and that can form a non-aqueous secondary battery having excellent cycle characteristics is obtained.

Furthermore, according to the present disclosure, an electrode for a non-aqueous secondary battery that can form a non-aqueous secondary battery having excellent cycle characteristics and a non-aqueous secondary battery that has excellent cycle characteristics are obtained.

DETAILED DESCRIPTION

The following provides a detailed description of embodiments of the present disclosure.

The presently disclosed binder composition for a non-aqueous secondary battery electrode can be used in production of a slurry composition for a non-aqueous secondary battery electrode. Moreover, the presently disclosed binder composition for a non-aqueous secondary battery electrode can be used in production of a slurry composition for a non-aqueous secondary battery electrode after being mixed with a conductive material to obtain a conductive material paste composition for a non-aqueous secondary battery electrode that contains the binder composition for a non-aqueous secondary battery electrode and the conductive material. A slurry composition for a non-aqueous secondary battery electrode produced using the presently disclosed binder composition for a non-aqueous secondary battery electrode can be used in formation of an electrode of a non-aqueous secondary battery such as a lithium ion secondary battery. Furthermore, the presently disclosed non-aqueous secondary battery includes an electrode for a non-aqueous secondary battery formed using the presently disclosed slurry composition for a non-aqueous secondary battery electrode.

Note that the presently disclosed binder composition for a non-aqueous secondary battery electrode, conductive material paste composition for a non-aqueous secondary battery electrode, and slurry composition for a non-aqueous secondary battery electrode can particularly suitably be used in formation of a positive electrode of a non-aqueous secondary battery.

(Binder Composition for Non-Aqueous Secondary Battery Electrode)

The presently disclosed binder composition for a non-aqueous secondary battery electrode contains a polymer that includes a monomer unit including a functional group that is bondable with a cationic group and a (meth)acrylic acid ester monomer unit (hereinafter, also referred to as "polymer (A)"), and an organic compound that includes at least two cationic groups (hereinafter, also referred to as "polyvalent cationic organic compound (B)"), and optionally further contains other components that can be compounded in electrodes of secondary batteries. The presently disclosed binder composition for a non-aqueous secondary battery electrode also typically contains a solvent such as an organic solvent. In addition, the presently disclosed binder composition for a non-aqueous secondary battery electrode has a viscosity change rate of 400% or less when left at rest at a temperature of 60° C. for 30 days.

The presently disclosed binder composition can improve viscosity stability of a slurry composition produced using the binder composition and cycle characteristics (particularly high-potential cycle characteristics) of a secondary battery produced using the binder composition as a result of containing the polymer that includes a monomer unit including a functional group that is bondable with a cationic group and a (meth)acrylic acid ester monomer unit, and the organic compound that includes at least two cationic groups, and as a result of also having a viscosity change rate of 400% or less when left at rest at a temperature of 60° C. for 30 days. Moreover, as a result of the presently disclosed binder composition containing the polymer (A) and the polyvalent cationic organic compound (B), functional groups of the polymer (A) and cationic groups of the polyvalent cationic organic compound (B) strongly interact through cross-linking or the like when an electrode mixed material layer is formed through drying or the like of a slurry composition that contains the binder composition. Since this strong interaction forms a rigid network, components contained in an electrode mixed material layer can be inhibited from eluting into electrolyte solution (i.e., electrolyte solution resistance of the electrode mixed material layer can be increased) through use of the presently disclosed binder composition.

<Polymer (A)>

In an electrode produced by forming an electrode mixed material layer on a current collector using a slurry composition for a non-aqueous secondary battery electrode produced using the binder composition, the polymer (A) holds components contained in the electrode mixed material layer to prevent these components detaching from the electrode mixed material layer (i.e., the polymer (A) is an adhesive polymer that functions as a binder).

[Chemical Composition of Polymer (A)]

The polymer (A) is a copolymer that includes a monomer unit including a functional group that is bondable with a cationic group (hereinafter, also referred to as a "bondable functional group") and a (meth)acrylic acid ester monomer unit. More specifically, the polymer (A) can be a copolymer that includes a monomer unit including a bondable functional group and a (meth)acrylic acid ester monomer unit, and that optionally further includes repeating units other than the monomer unit including a bondable functional group and the (meth)acrylic acid ester monomer unit (hereinafter, also referred to as "other repeating units"). Note that in the following description, a "monomer including a functional group that is bondable with a cationic group" is also referred to as a "bondable functional group-containing monomer" and a "monomer unit including a functional group that is bondable with a cationic group" is also referred to as a "bondable functional group-containing monomer unit".

[[Bondable Functional Group-Containing Monomer Unit]]

The functional group that is bondable with a cationic group and that is included in the bondable functional group-containing monomer unit is not specifically limited and may be a carboxyl group, a sulfo group, a phosphate group, a hydroxyl group, or the like that can interact well with a cationic group. Of these functional groups, a carboxyl group, a sulfo group, and a phosphate group are more preferable, and a carboxyl group is particularly preferable. Note that the bondable functional group-containing monomer unit may include just one type of bondable functional group, or may include two or more types of bondable functional groups.

Examples of bondable functional group-containing monomers that can form the bondable functional group-containing monomer unit include carboxyl group-containing monomers, sulfo group-containing monomers, phosphate group-containing monomers, and hydroxyl group-containing monomers.

Examples of carboxyl group-containing monomers include monocarboxylic acids, derivatives of monocarboxylic acids, dicarboxylic acids, acid anhydrides of dicarboxylic acids, and derivatives of dicarboxylic acids and acid anhydrides thereof.

Examples of monocarboxylic acids include acrylic acid, methacrylic acid, and crotonic acid.

Examples of derivatives of monocarboxylic acids include 2-ethylacrylic acid, isocrotonic acid, α-acetoxyacrylic acid, β-trans-aryloxyacrylic acid, α-chloro-β-E-methoxyacrylic acid, and β-diaminoacrylic acid.

Examples of dicarboxylic acids include maleic acid, fumaric acid, and itaconic acid.

Examples of derivatives of dicarboxylic acids include methylmaleic acid, dimethylmaleic acid, phenylmaleic acid, chloromaleic acid, dichloromaleic acid, fluoromaleic acid, and maleic acid monoesters such as nonyl maleate, decyl maleate, dodecyl maleate, octadecyl maleate, and fluoroalkyl maleates.

Examples of acid anhydrides of dicarboxylic acids include maleic anhydride, acrylic anhydride, methylmaleic anhydride, and dimethylmaleic anhydride.

Furthermore, an acid anhydride that produces a carboxyl group upon hydrolysis can also be used as a carboxyl group-containing monomer.

Examples of sulfo group-containing monomers include vinyl sulfonic acid, methyl vinyl sulfonic acid, (meth)allyl sulfonic acid, 3-allyloxy-2-hydroxypropane sulfonic acid, and 2-acrylamido-2-methylpropane sulfonic acid.

In the present disclosure, "(meth)allyl" is used to indicate "allyl" and/or "methallyl".

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

In the present disclosure, "(meth)acryloyl" is used to indicate "acryloyl" and/or "methacryloyl".

Examples of hydroxyl group-containing monomers include ethylenically unsaturated alcohols such as (meth)allyl alcohol, 3-buten-1-ol, and 5-hexen-1-ol; alkanol esters of ethylenically unsaturated carboxylic acids such as 2-hydroxyethyl acrylate, 2-hydroxypropyl acrylate, 2-hydroxyethyl methacrylate, 2-hydroxypropyl methacrylate, di-2-hydroxyethyl maleate, di-4-hydroxybutyl maleate, and di-2-hydroxypropyl itaconate; esters of (meth)acrylic acid and polyalkylene glycol represented by a general formula $CH_2=CR^Z-COO-(C_nH_{2n}O)_m-H$ (where m represents an integer of 2 to 9, n represents an integer of 2 to 4, and $R^Z$ represents hydrogen or a methyl group); mono(meth)acrylic acid esters of dihydroxy esters of dicarboxylic acids such as 2-hydroxyethyl-2'-(meth)acryloyloxy phthalate and 2-hydroxyethyl-2'-(meth)acryloyloxy succinate; vinyl ethers such as 2-hydroxyethyl vinyl ether and 2-hydroxypropyl vinyl ether; mono(meth)allyl ethers of alkylene glycols such as (meth)allyl-2-hydroxyethyl ether, (meth)allyl-2-hydroxypropyl ether, (meth)allyl-3-hydroxypropyl ether, (meth)allyl-2-hydroxybutyl ether, (meth)allyl-3-hydroxybutyl ether, (meth)allyl-4-hydroxybutyl ether, and (meth)allyl-6-hydroxyhexyl ether; polyoxyalkylene glycol mono(meth)allyl ethers such as diethylene glycol mono(meth)allyl ether and dipropylene glycol mono(meth)allyl ether; mono(meth)allyl ethers of halogen or hydroxy substituted (poly)alkylene glycols such as glycerin mono(meth)allyl ether, (meth)allyl-2-chloro-3-hydroxypropyl ether, and (meth)allyl-2-hydroxy-3-chloropropyl ether; mono(meth)allyl ethers of polyhydric phenols such as eugenol and isoeugenol, and halogen substituted products thereof; and (meth)allyl thioethers of alkylene glycols such as (meth)allyl-2-hydroxyethyl thioether and (meth)allyl-2-hydroxypropyl thioether.

Of these examples, carboxyl group-containing monomers, sulfo group-containing monomers, and phosphate group-containing monomers are preferable as the bondable functional group-containing monomer from a viewpoint of causing the polymer (A) to interact well with the polyvalent cationic organic compound (B) and further improving electrolyte solution resistance of an electrode mixed material layer, with carboxyl group-containing monomers being more preferable. In other words, at least one selected from the group consisting of a carboxyl group-containing monomer unit, a sulfo group-containing monomer unit, and a phosphate group-containing monomer unit is preferable as the bondable functional group-containing monomer unit, and a carboxyl group-containing monomer unit is more preferable as the bondable functional group-containing monomer unit.

One type of bondable functional group-containing monomer may be used individually, or two or more types of bondable functional group-containing monomers may be used in combination in a freely selected ratio.

The proportion in which the polymer (A) includes the bondable functional group-containing monomer unit is preferably 0.1 mass % or more, more preferably 1.0 mass % or more, and even more preferably 2.0 mass % or more, and is preferably 10 mass % or less, more preferably 8.0 mass % or less, and even more preferably 7.0 mass % or less. When the proportional content of the bondable functional group-containing monomer unit is within any of the ranges set forth above, viscosity stability of a slurry composition and cycle characteristics of a secondary battery can be further improved, and internal resistance of a secondary battery can be lowered. Moreover, when the proportional content of the bondable functional group-containing monomer unit is not less than any of the lower limits set forth above, the polymer (A) can be caused to interact well with the polyvalent cationic organic compound (B), and electrolyte solution resistance of an electrode mixed material layer formed using the binder composition can be improved. Furthermore, when the proportional content of the bondable functional group-containing monomer unit is not more than any of the upper limits set forth above, aggregation due to excessive interaction of the polymer (A) with the polyvalent cationic organic compound (B) can be inhibited, and viscosity stability of the binder composition can be increased.

[[(Meth)Acrylic Acid Ester Monomer Unit]]

Examples of (meth)acrylic acid ester monomers that can form the (meth)acrylic acid ester monomer unit include acrylic acid alkyl esters such as methyl acrylate, ethyl acrylate, n-propyl acrylate, isopropyl acrylate, n-butyl acrylate, t-butyl acrylate, isobutyl acrylate, n-pentyl acrylate, isopentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and methacrylic acid alkyl esters such as methyl methacrylate, ethyl methacrylate, n-propyl methacrylate, isopropyl methacrylate, n-butyl methacrylate, t-butyl methacrylate, isobutyl methacrylate, n-pentyl methacrylate, isopentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate. Of these (meth)acrylic acid ester monomers, methyl acrylate, ethyl acrylate, n-butyl acrylate, 2-ethylhexyl acrylate, methyl methacrylate, ethyl methacrylate, n-butyl methacrylate, and 2-ethylhexyl methacrylate are preferable, and n-butyl acrylate, ethyl methacrylate, and 2-ethylhexyl acrylate are more preferable.

One of these (meth)acrylic acid ester monomers may be used individually, or two or more of these (meth)acrylic acid ester monomers may be used in combination.

The proportion in which the polymer (A) includes the (meth)acrylic acid ester monomer unit is preferably 40 mass % or more, more preferably 45 mass % or more, and even more preferably 50 mass % or more, and is preferably 80 mass % or less, more preferably 79.9 mass % or less, even more preferably 75 mass % or less, and particularly preferably 70 mass % or less. When the proportional content of the (meth)acrylic acid ester monomer unit is within any of the ranges set forth above, cycle characteristics of a secondary battery can be further improved. Moreover, when the proportional content of the (meth)acrylic acid ester monomer unit is not less than any of the lower limits set forth above, electrolyte solution resistance of an electrode mixed material layer formed using the binder composition can be improved. Furthermore, when the proportional content of the (meth) acrylic acid ester monomer unit is not more than any of the upper limits set forth above, viscosity stability of a slurry composition can be further improved, and internal resistance of a secondary battery can be lowered.

[[Other Repeating Units]]

Examples of other repeating units that can be included in the polymer (A) include, but are not specifically limited to, an aromatic vinyl monomer unit, a nitrile group-containing monomer unit, a conjugated diene monomer unit, and an alkylene structural unit.

Of these other repeating units, the inclusion of an aromatic vinyl monomer unit in the polymer (A) is preferable from a viewpoint of further improving viscosity stability of a slurry composition and cycle characteristics of a secondary battery, and lowering internal resistance of a secondary battery. Since interaction between the polymer (A) and the polyvalent cationic organic compound (B) causes polymer chains of the polymer (A) to spread out in the presently disclosed binder composition, an aromatic vinyl monomer unit can be caused to better display an effect of improving slurry composition viscosity stability.

Note that from a viewpoint of improving cycle characteristics (particularly high-potential cycle characteristics) of a secondary battery, the total proportional content of a conjugated diene monomer unit and an alkylene structural unit in the polymer (A) is preferably 5 mass % or less, and more preferably 1 mass % or less, and it is particularly preferable that the polymer (A) does not include a conjugated diene monomer unit and an alkylene structural unit.

—Aromatic Vinyl Monomer Unit—

Examples of aromatic vinyl monomers that can form an aromatic vinyl monomer unit include styrene, α-methylstyrene, butoxystyrene, and vinylnaphthalene. Of these aromatic vinyl monomers, styrene is preferable.

One of these aromatic vinyl monomers may be used individually, or two or more of these aromatic vinyl monomers may be used in combination.

The proportion in which the polymer (A) includes an aromatic vinyl monomer unit is preferably 20 mass % or more, more preferably 22 mass % or more, and even more preferably 25 mass % or more, and is preferably 40 mass % or less, more preferably 38 mass % or less, and even more preferably 35 mass % or less. When the proportional content of an aromatic vinyl monomer unit is within any of the ranges set forth above, cycle characteristics of a secondary battery can be further improved. Moreover, when the proportional content of an aromatic vinyl monomer unit is not less than any of the lower limits set forth above, viscosity stability of a slurry composition can be further improved, and internal resistance of a secondary battery can be lowered. Furthermore, when the proportional content of an aromatic vinyl monomer unit is not more than any of the upper limits set forth above, electrolyte solution resistance of an electrode mixed material layer formed using the binder composition can be improved.

—Nitrile Group-Containing Monomer Unit—

Examples of nitrile group-containing monomers that can form a nitrile group-containing monomer unit include α,β-ethylenically unsaturated nitrile monomers. Specifically, any α,β-ethylenically unsaturated compound that includes a nitrile group can be used as an α,β-ethylenically unsaturated nitrile monomer without any specific limitations. Examples include acrylonitrile; α-halogenoacrylonitriles such as α-chloroacrylonitrile and α-bromoacrylonitrile; and α-alkylacrylonitriles such as methacrylonitrile and α-ethylacrylonitrile. Of these examples, acrylonitrile and methacrylonitrile are preferable as nitrile group-containing monomers, and acrylonitrile is more preferable as a nitrile group-containing monomer.

One of these nitrile group-containing monomers may be used individually, or two or more of these nitrile group-containing monomers may be used in combination.

The proportion in which the polymer (A) includes a nitrile group-containing monomer unit is preferably 1.0 mass % or more, and more preferably 2.0 mass % or more, and is preferably 40 mass % or less, more preferably 30 mass % or less, and even more preferably 20 mass % or less. When the proportional content of a nitrile group-containing monomer unit is not more than any of the upper limits set forth above, electrolyte solution resistance of an electrode mixed material layer formed using the binder composition and cycle characteristics of a secondary battery can be improved.

—Conjugated Diene Monomer Unit—

Examples of conjugated diene monomers that can form a conjugated diene monomer unit include conjugated diene compounds having a carbon number of 4 or more such as 1,3-butadiene, isoprene, 2,3-dimethyl-1,3-butadiene, and 1,3-pentadiene. Of these conjugated diene monomers, 1,3-butadiene is preferable.

—Alkylene Structural Unit—

An alkylene structural unit is a repeating unit that is composed of only an alkylene structure represented by a general formula —$C_nH_{2n}$— (n is an integer of 2 or more).

The method by which an alkylene structural unit is introduced into the polymer (A) is not specifically limited and may be either of the following methods (1) or (2), for example.

(1) A method in which a copolymer is produced from a monomer composition containing a conjugated diene monomer (for example, 1,3-butadiene, isoprene, 2,3-dimethyl-1, 3-butadiene, 1,3-pentadiene, etc.), and then the copolymer is hydrogenated to convert a conjugated diene monomer unit to an alkylene structural unit (2) A method in which a copolymer is produced from a monomer composition containing a 1-olefin monomer (for example, ethylene, propylene, 1-butene, 1-hexene, etc.)

Of these methods, method (1) is preferable in terms of ease of production of the polymer (A).

[Properties of Polymer (A)]

The weight-average molecular weight of the polymer (A) is preferably 1,000 or more, more preferably 5,000 or more, and even more preferably 10,000 or more, and is preferably 250,000 or less, more preferably 200,000 or less, and even more preferably 150,000 or less. When the weight-average molecular weight of the polymer (A) is not less than any of the lower limits set forth above, electrolyte solution resistance of an electrode mixed material layer formed using the binder composition and cycle characteristics of a secondary battery can be improved. Moreover, when the weight-average molecular weight of the polymer (A) is not more than any of the upper limits set forth above, viscosity stability of the binder composition, viscosity stability of a slurry composition, and cycle characteristics of a secondary battery can be improved, and internal resistance of a secondary battery can be lowered.

Note that the weight-average molecular weight of the polymer (A) can be adjusted without any specific limitations by, for example, altering the amount of a molecular weight modifier (for example, tert-dodecyl mercaptan) and the types and amounts of monomers used in production of the polymer (A).

[Production Method of Polymer (A)]

Although no specific limitations are placed on the method by which the polymer (A) set forth above is produced, the polymer (A) can be produced by, for example, polymerizing a monomer composition containing the monomers described above to obtain a copolymer and then hydrogenating the obtained copolymer as necessary.

The proportional content of each monomer in the monomer composition used in production of the polymer (A) can be set in accordance with the proportional content of each repeating unit in the polymer (A).

The polymerization method is not specifically limited, and any of solution polymerization, suspension polymerization, bulk polymerization, and emulsion polymerization may be used. Moreover, ionic polymerization, radical polymerization, living radical polymerization, or the like may be adopted as the polymerization reaction.

Note that in a case in which a molecular weight modifier is used in production of the polymer (A), the amount of the molecular weight modifier is preferably less than 0.5 parts by mass per 100 parts by mass, in total, of monomers.

<Organic Compound>

The polyvalent cationic organic compound (B) is not specifically limited so long as it is an organic compound that includes a plurality of cationic groups in a single molecule thereof. Each of the cationic groups may, for example, be a nitrogen-containing functional group (excluding an amide group) such as a substituted or unsubstituted amino group ($-NH_2$, $-NHR^1$, $-NR^1R^2$, or $-N+R^1R^2R^3$; $R^1$ to $R^3$ represent any substituents), an imino group ($=NH$), or an oxazoline group. Of these groups, a primary amino group ($-NH_2$; unsubstituted amino group), a secondary amino group ($-NHR^1$), and an imino group are preferable from a viewpoint of causing the polyvalent cationic organic compound (B) to interact well with the polymer (A), and a primary amino group is more preferable. Note that the polyvalent cationic organic compound (B) may include just one type of cationic group, or may include two or more types of cationic groups. Moreover, the polyvalent cationic organic compound (B) may be a non-polymer or a polymer.

Also note that in the present disclosure, a polymer that is an organic compound including at least two cationic groups is considered to correspond to the polyvalent cationic organic compound (B) rather than the polymer (A) even in a case in which the polymer also includes a functional group that is bondable with a cationic group.

[Examples of Polyvalent Cationic Organic Compound (B)]

The polyvalent cationic organic compound (B) is, for example, preferably an organic compound including at least two substituted or unsubstituted amino groups (hereinafter, also referred to simply as an "amino group-containing compound"), and more preferably an organic compound including at least two unsubstituted amino groups.

Examples of the amino group-containing compound that are non-polymers include ethylenediamine, 1,4-diaminobutane, triethylenetetramine, phenylenediamine, 4,4'-diaminodiphenyl ether, N,N'-bis(3-phenyl-2-propenylidene)-1,6-hexanediamine, and bisanilines.

Examples of the amino group-containing compound that are polymers include polyethyleneimine; polyethyleneimine derivatives such as poly(N-hydroxylethyleneimine) and carboxymethylated polyethyleneimine sodium salt; polypropyleneimine; polypropyleneimine derivatives such as poly(N-2-dihydroxylpropyleneimine); poly(allylamine); poly(allylamine) derivatives such as poly(dimethyldiallylammonium halide); an aminoethylated acrylic polymer obtained through aminoethylation of an acrylic acid polymer; and cationized cellulose obtained through modification of a cellulose derivative (hydroxyethyl cellulose, carboxymethyl cellulose, etc.) with a cationization agent including a substituted or unsubstituted amino group.

Of these examples, polyethyleneimine and polyethyleneimine derivatives are preferable in terms that strong cross-linking can be constructed due to the high number of amino groups per unit volume, and electrolyte solution resistance of an electrode mixed material layer can be further improved, with polyethyleneimine being more preferable.

[Properties of Polyvalent Cationic Organic Compound (B)]

The molecular weight of the polyvalent cationic organic compound (B) ("weight-average molecular weight" in a case in which the polyvalent cationic organic compound (B) is a polymer) is preferably 100 or more, and more preferably 200 or more, and is preferably 1,000 or less, and more preferably 600 or less. When the molecular weight of the polyvalent cationic organic compound (B) is not less than any of the lower limits set forth above, electrolyte solution resistance of an electrode mixed material layer formed using the binder composition and cycle characteristics of a secondary battery can be further improved. Moreover, when the molecular weight of the polyvalent cationic organic compound (B) is not more than any of the upper limits set forth above, viscosity stability of the binder composition, viscosity stability of a slurry composition, and cycle characteristics of a secondary battery can be improved, and internal resistance of a secondary battery can be lowered.

The amine value of the polyvalent cationic organic compound (B) is preferably 1 mmol/g or more, more preferably 2.5 mmol/g or more, and even more preferably 5 mmol/g or more, and is preferably 30 mmol/g or less, and more preferably 25 mmol/g or less. When the amine value of the polyvalent cationic organic compound (B) is within any of the ranges set forth above, a rigid network can be efficiently formed in an electrode mixed material layer. Consequently, electrolyte solution resistance of the electrode mixed material layer can be further improved.

The amine value of the polyvalent cationic organic compound (B) referred to in the present disclosure is a value that expresses the number of millimoles of potassium hydroxide equivalent to the amount of perchloric acid required to neutralize all basic nitrogen contained in 1 g of the polyvalent cationic organic compound (B). Note that the amine value can be determined as an amount per 1 g of solid content of the polyvalent cationic organic compound (B) by converting a mg KOH/g value obtained in accordance with the potentiometric titration method described in JIS K 7237(1995) to mmol/g.

[Content of Polyvalent Cationic Organic Compound (B)]

The content of the polyvalent cationic organic compound (B) relative to the total (100 mass %) of the polymer (A) and the polyvalent cationic organic compound (B) is preferably not less than 1 mass % and not more than 20 mass %, more preferably not less than 1 mass % and not more than 15 mass %, even more preferably not less than 1 mass % and not more than 10 mass %, and particularly preferably not less than 1 mass % and not more than 5 mass %. When the content of the polyvalent cationic organic compound (B) is not more than any of the upper limits set forth above, viscosity stability of the binder composition can be ensured while also inhibiting unreacted residue from acting as a plasticizer to reduce peel strength of an electrode. Moreover, when the content of the polyvalent cationic organic compound (B) is not less than the lower limit set forth above, electrolyte solution resistance of an electrode mixed material layer can be further improved because the polymer (A) and the polyvalent cationic organic compound (B) can form a rigid network in the electrode mixed material layer.

<Solvent>

The solvent of the binder composition for a non-aqueous secondary battery electrode is preferably an organic solvent. Examples of organic solvents that can be used include, but are not specifically limited to, alcohols such as methanol, ethanol, n-propanol, isopropanol, n-butanol, isobutanol, t-butanol, pentanol, hexanol, heptanol, octanol, nonanol, decanol, and amyl alcohol; ketones such as acetone, methyl ethyl ketone, and cyclohexanone; esters such as ethyl acetate and butyl acetate; ethers such as diethyl ether, dioxane, and tetrahydrofuran; amide polar organic solvents such as N,N-dimethylformamide and N-methylpyrrolidone (NMP); and aromatic hydrocarbons such as toluene, xylene, chlorobenzene, orthodichlorobenzene, and paradichlorobenzene. One of these organic solvents may be used individually, or two or more of these organic solvents may be used as a mixture.

Of these organic solvents, polar organic solvents are preferable as the solvent, and NMP is more preferable as the solvent.

<Other Components>

Besides the components described above, the presently disclosed binder composition for a non-aqueous secondary battery electrode may contain components such as binders other than the polymer (A) (for example, polyvinylidene fluoride, polyacrylonitrile, polyacrylate, etc.), reinforcing materials, leveling agents, viscosity modifiers, and additives for electrolyte solution. These other components are not specifically limited so long as they do not affect the battery reactions and may be selected from commonly known components such as those described in WO2012/115096A1. One of these components may be used individually, or two or more of these components may be used in combination in a freely selected ratio.

<Properties of Binder Composition>

The presently disclosed binder composition for a non-aqueous secondary battery electrode is required to have a viscosity change rate of not less than 0% and not more than 400% when left at rest at a temperature of 60° C. for 30 days. Moreover, the viscosity change rate of the binder composition when the binder composition is left at rest at a temperature of 60° C. for 30 days is preferably 200% or less, more preferably 100% or less, and even more preferably 40% or less. When the viscosity change rate of the binder composition exceeds 400%, viscosity stability of a slurry composition decreases and cycle characteristics of a secondary battery deteriorate. On the other hand, when the viscosity change rate of the binder composition is not more than any of the upper limits set forth above, viscosity stability of a slurry composition and cycle characteristics of a secondary battery can be further improved.

Note that the viscosity change rate of the binder composition can be adjusted by, for example, altering the weight-average molecular weight of the polymer (A), the molecular weight of the polyvalent cationic organic compound (B), and the amounts of the polymer (A) and the polyvalent cationic organic compound (B).

(Slurry Composition for Non-Aqueous Secondary Battery Electrode)

The presently disclosed slurry composition for a non-aqueous secondary battery electrode contains an electrode active material and the binder composition set forth above, and optionally further contains a conductive material and other components. In other words, the presently disclosed slurry composition contains an electrode active material, the previously described polymer (A), the previously described polyvalent cationic organic compound (B), and a solvent, and optionally further contains a conductive material and other components. As a result of the presently disclosed slurry composition containing the binder composition set forth above, the presently disclosed slurry composition has excellent viscosity stability, and an electrode mixed material layer formed using the presently disclosed slurry composition has excellent electrolyte solution resistance and can cause a secondary battery to display excellent cycle characteristics.

<Electrode Active Material>

The electrode active material is a material that gives and receives electrons in an electrode of a non-aqueous secondary battery. In a case in which the non-aqueous secondary battery is a lithium ion secondary battery, for example, the electrode active material is normally a material that can occlude and release lithium.

Although the following describes, as one example, a case in which the slurry composition for a non-aqueous secondary battery electrode is a slurry composition for a lithium ion secondary battery electrode, the presently disclosed slurry composition for a non-aqueous secondary battery electrode is not limited to the following example.

Examples of positive electrode active materials for a lithium ion secondary battery include, but are not specifically limited to, known positive electrode active materials such as lithium-containing cobalt oxide ($LiCoO_2$), lithium manganate ($LiMn_2O_4$), lithium-containing nickel oxide ($LiNiO_2$), a lithium-containing complex oxide of Co—Ni—Mn ($Li(CoMnNi)O_2$), a lithium-containing complex oxide of Ni—Mn—Al, a lithium-containing complex oxide of Ni—Co—Al, olivine-type lithium iron phosphate ($LiFePO_4$), olivine-type lithium manganese phosphate ($LiMnPO_4$), a $Li_2MnO_3$—$LiNiO_2$-based solid solution, lithium-rich spinel compounds represented by $Li_{1+x}Mn_{2-x}O_4$ (0<x<2), $Li[Ni_{0.17}Li_{0.2}Co_{0.07}Mn_{0.56}]O_2$, and $LiNi_{0.5}Mn_{1.5}O_4$.

The amount and particle diameter of the positive electrode active material are not specifically limited and may be the same as those of conventionally-used positive electrode active materials.

Examples of negative electrode active materials for a lithium ion secondary battery include carbon-based negative electrode active materials, metal-based negative electrode active materials, and negative electrode active materials that are a combination thereof.

A carbon-based negative electrode active material can be defined as an active material that contains carbon as its main framework and into which lithium can be inserted (also referred to as "doping"). Examples of carbon-based negative electrode active materials include carbonaceous materials and graphitic materials.

Examples of carbonaceous materials include graphitizing carbon and non-graphitizing carbon, typified by glassy carbon, which has a structure similar to an amorphous structure.

The graphitizing carbon may be a carbon material made using tar pitch obtained from petroleum or coal as a raw material. Specific examples of graphitizing carbon include coke, mesocarbon microbeads (MCMB), mesophase pitch-based carbon fiber, and pyrolytic vapor-grown carbon fiber.

Examples of the non-graphitizing carbon include pyrolyzed phenolic resin, polyacrylonitrile-based carbon fiber, quasi-isotropic carbon, pyrolyzed furfuryl alcohol resin (PFA), and hard carbon.

Examples of graphitic materials include natural graphite and artificial graphite.

Examples of the artificial graphite include artificial graphite obtained by heat-treating carbon containing graphitizing carbon mainly at 2800° C. or higher, graphitized MCMB obtained by heat-treating MCMB at 2000° C. or higher, and graphitized mesophase pitch-based carbon fiber obtained by heat-treating mesophase pitch-based carbon fiber at 2000° C. or higher.

A metal-based negative electrode active material is an active material that contains metal, the structure of which usually contains an element that allows insertion of lithium, and that has a theoretical electric capacity per unit mass of 500 mAh/g or more when lithium is inserted. Examples of the metal-based active material include lithium metal; a simple substance of metal that can form a lithium alloy (e.g., Ag, Al, Ba, Bi, Cu, Ga, Ge, In, Ni, P, Pb, Sb, Si, Sn, Sr, Zn, and Ti); alloys of the simple substance of metal; and oxides, sulfides, nitrides, silicides, carbides, and phosphides of lithium metal, the simple substance of metal, and the alloys of the simple substance of metal. Of these metal-based negative electrode active materials, active materials containing silicon (silicon-based negative electrode active materials) are preferred. One reason for this is that the capacity of a lithium ion secondary battery can be increased through use of a silicon-based negative electrode active material.

Examples of the silicon-based negative electrode active material include silicon (Si), a silicon-containing alloy, SiO, $SiO_x$, and a composite material of conductive carbon and a Si-containing material obtained by coating or combining the Si-containing material with the conductive carbon. One of these silicon-based negative electrode active materials may be used individually, or two or more of these silicon-based negative electrode active materials may be used in combination.

The amount and particle diameter of the negative electrode active material are not specifically limited and may be the same as those of conventionally-used negative electrode active materials.

<Binder Composition for Non-Aqueous Secondary Battery Electrode>

A binder composition for a non-aqueous secondary battery electrode that contains the previously described polymer (A) and polyvalent cationic organic compound (B) is used as the binder composition for a non-aqueous secondary battery electrode.

The proportional content of the binder composition in the slurry composition for a non-aqueous secondary battery electrode is an amount such that the amount of the polymer (A) per 100 parts by mass of the electrode active material is preferably 0.1 parts by mass or more, and more preferably 0.3 parts by mass or more, and is preferably 3 parts by mass or less, and more preferably 1.5 parts by mass or less. When the binder composition is contained in the slurry composition in an amount such that the amount of the polymer (A) is within any of the ranges set forth above, electrolyte solution resistance of an electrode mixed material layer can be further improved.

<Conductive Material>

The conductive material ensures electrical contact amongst the electrode active material. Examples of conductive materials that can be used include conductive carbon materials such as carbon black (for example, acetylene black, Ketjenblack® (Ketjenblack is a registered trademark in Japan, other countries, or both), furnace black, etc.), single-walled and multi-walled carbon nanotubes (multi-walled carbon nanotubes are inclusive of cup-stacked carbon nanotubes), carbon nanohorns, vapor-grown carbon fiber, milled carbon fiber obtained through pyrolysis and subsequent pulverization of polymer fiber, single-layered and multi-layered graphene, and carbon non-woven fabric sheet obtained through pyrolysis of non-woven fabric made from polymer fiber; and fibers and foils of various metals.

One of these conductive materials may be used individually, or two or more of these conductive materials may be used in combination.

The proportional content of the conductive material in the slurry composition for a non-aqueous secondary battery electrode is preferably 0.1 parts by mass or more, and more preferably 0.5 parts by mass or more per 100 parts by mass of the electrode active material, and is preferably 5 parts by mass or less, and more preferably 3 parts by mass or less per 100 parts by mass of the electrode active material. When the amount of the conductive material is within any of the ranges set forth above, sufficient electrical contact amongst the electrode active material can be ensured, and a secondary battery can be caused to display excellent battery characteristics (output characteristics, etc.).

<Other Components>

Examples of other components that may be contained in the slurry composition include, but are not specifically limited to, the same other components as may be contained in the binder composition set forth above. One other component may be used individually, or two or more other components may be used in combination in a freely selected ratio.

<Production of Slurry Composition>

The slurry composition set forth above can be produced by dissolving or dispersing the above-described components in a solvent such as an organic solvent. Specifically, the slurry composition can be produced by mixing the above-described components and the solvent using a mixer such as a ball mill, a sand mill, a bead mill, a pigment disperser, a grinding machine, an ultrasonic disperser, a homogenizer, a planetary mixer, or a FILMIX. Note that the solvent contained in the binder composition may serve as the solvent used in production of the slurry composition.

The order in which the components are mixed in the solvent is not specifically limited and may be any order. More specifically, in production of the slurry composition, the components can be mixed in an order described below in any of (1) to (3), for example.

(1) The components are mixed all at once.

(2) The binder composition containing the polymer (A) and the polyvalent cationic organic compound (B) and the conductive material are mixed to obtain a conductive material paste composition for a non-aqueous secondary battery electrode, and then the electrode active material is added to the conductive material paste composition for a non-aqueous secondary battery electrode and is mixed therewith.

(3) The conductive material and the electrode active material are mixed, and then the binder composition containing the polymer (A) and the polyvalent cationic organic compound (B) is added to the resultant mixture and is mixed therewith.

Of the above examples, mixing of the components in the order described in (1) or (2) is preferable. Note that in a case in which the order described in (2) is adopted (i.e., in a case in which the binder composition and the conductive material are mixed in advance to obtain a conductive material paste composition for a non-aqueous secondary battery electrode containing the conductive material and the previously described binder composition (i.e., containing the conductive material, the polymer (A), the polyvalent cationic organic compound (B), and a solvent)), the polymer (A) can be adsorbed onto the surface of the conductive material so as to enable good dispersion of the conductive material. As a result, a secondary battery can be caused to display excellent battery characteristics (output characteristics, etc.). Note that the conductive material paste composition for a non-aqueous secondary battery electrode referred to in the present disclosure is an intermediate product for producing the presently disclosed slurry composition for a non-aqueous secondary battery electrode, and is a composition in the form of a paste that contains the conductive material, the polymer (A), the polyvalent cationic organic compound (B), and a solvent as previously described, but does not contain the electrode active material.

(Electrode for Non-Aqueous Secondary Battery)

The presently disclosed electrode for a secondary battery includes a current collector and an electrode mixed material layer formed on the current collector, wherein the electrode mixed material layer is formed using the slurry composition for a non-aqueous secondary battery electrode set forth above. In other words, the electrode mixed material layer contains at least an electrode active material, the polymer (A), and the polyvalent cationic organic compound (B). The polymer (A) and the polyvalent cationic organic compound (B) may form a cross-linked structure. In other words, the electrode mixed material layer may contain a cross-linked product of the polymer (A) and the polyvalent cationic organic compound (B). It should be noted that components contained in the electrode mixed material layer are components that were contained in the slurry composition for a non-aqueous secondary battery electrode. Furthermore, the preferred ratio of these components in the electrode mixed material layer is the same as the preferred ratio of these components in the slurry composition.

As a result of a slurry composition that contains the presently disclosed binder composition for a non-aqueous secondary battery electrode being used in the presently disclosed electrode for a non-aqueous secondary battery, a rigid electrode mixed material layer in which the polymer (A) and the polyvalent cationic organic compound (B) strongly interact can be well formed on the current collector in the presently disclosed electrode for a non-aqueous secondary battery. Consequently, a secondary battery in which elution of an electrode mixed material layer into electrolyte solution is inhibited and that has excellent battery characteristics such as cycle characteristics is obtained by using this electrode.

<Production Method of Electrode>

The presently disclosed electrode for a non-aqueous secondary battery is produced, for example, through a step of applying the above-described slurry composition onto the current collector (application step) and a step of drying the slurry composition that has been applied onto the current collector to form an electrode mixed material layer on the current collector (drying step).

[Application Step]

The slurry composition can be applied onto the current collector by any commonly known method without any specific limitations. Specific examples of application methods that can be used include doctor blading, dip coating, reverse roll coating, direct roll coating, gravure coating, extrusion coating, and brush coating. During application, the slurry composition may be applied onto one side or both sides of the current collector. The thickness of the slurry coating on the current collector after application but before drying may be set as appropriate in accordance with the thickness of the electrode mixed material layer to be obtained after drying.

The current collector onto which the slurry composition is applied is a material having electrical conductivity and electrochemical durability. Specifically, the current collector may be made of, for example, iron, copper, aluminum, nickel, stainless steel, titanium, tantalum, gold, or platinum. One of these materials may be used individually, or two or more of these materials may be used in combination in a freely selected ratio.

[Drying Step]

The slurry composition on the current collector may be dried by a commonly known method without any specific limitations. Examples of drying methods that can be used include drying by warm, hot, or low-humidity air; drying in a vacuum; and drying by irradiation with infrared light, electron beams, or the like. Drying of the slurry composition on the current collector in this manner forms an electrode mixed material layer on the current collector and thereby provides an electrode for a secondary battery that includes the current collector and the electrode mixed material layer. The drying temperature is preferably not lower than 60° C. and not higher than 200° C., and more preferably not lower than 90° C. and not higher than 150° C.

Note that in a case in which a polymer including at least one among a carboxyl group, a sulfo group, and a phosphate group is used as the polymer (A) and an amino group-containing compound is used as the polyvalent cationic organic compound (B), for example, the polymer (A) and the polyvalent cationic organic compound (B) can be cross-linked through amide bonds so as to further improve electrolyte solution resistance of the electrode mixed material layer and further improve cycle characteristics of a secondary battery.

After the drying step, the electrode mixed material layer may be further subjected to a pressing process, such as mold pressing or roll pressing. The pressing process can improve close adherence between the electrode mixed material layer and the current collector. Furthermore, in a case in which the electrode mixed material layer contains a curable polymer, the polymer is preferably cured after the electrode mixed material layer has been formed.

(Non-Aqueous Secondary Battery)

The presently disclosed non-aqueous secondary battery includes a positive electrode, a negative electrode, an electrolyte solution, and a separator, and includes the presently disclosed electrode for a secondary battery as at least one of the positive electrode and the negative electrode. The presently disclosed non-aqueous secondary battery has excellent battery characteristics such as cycle characteristics as a result of including the presently disclosed electrode for a non-aqueous secondary battery.

Although the following describes, as one example, a case in which the non-aqueous secondary battery is a lithium ion secondary battery, the presently disclosed non-aqueous secondary battery is not limited to the example described below.

<Electrodes>

Examples of electrodes other than the electrode for a non-aqueous secondary battery set forth above that can be used in the presently disclosed non-aqueous secondary battery include, without any specific limitations, any known electrode that is used in production of a secondary battery. Specifically, an electrode obtained by forming an electrode mixed material layer on a current collector by a known production method may be used as an electrode other than the electrode for a non-aqueous secondary battery set forth above.

<Electrolyte Solution>

The electrolyte solution is normally an organic electrolyte solution obtained by dissolving a supporting electrolyte in an organic solvent. The supporting electrolyte of a lithium ion secondary battery may, for example, be a lithium salt. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable as they readily dissolve in solvents and exhibit a high degree of dissociation, and $LiPF_6$ is particularly preferable. One electrolyte may be used individually, or two or more electrolytes may be used in combination in a freely selected ratio. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolyte solution is not specifically limited so long as the supporting electrolyte can dissolve therein. Examples of suitable organic solvents include carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of these solvents may be used. Of these solvents, carbonates are preferable due to having high permittivity and a wide stable potential region.

The concentration of the electrolyte in the electrolyte solution may be adjusted as appropriate. Furthermore, known additives may be added to the electrolyte solution.

<Separator>

The separator may be a separator such as described in JP2012-204303A, for example, but is not specifically limited thereto. Of these separators, a microporous membrane made of polyolefinic (polyethylene, polypropylene, polybutene, or polyvinyl chloride) resin is preferred because such a membrane can reduce the total thickness of the separator, which increases the ratio of electrode active material in the secondary battery, and consequently increases the volumetric capacity of the secondary battery.

<Production Method of Secondary Battery>

The presently disclosed secondary battery may be produced, for example, by stacking the positive electrode and the negative electrode with the separator in-between, performing rolling, folding, or the like of the resultant laminate in accordance with the battery shape as necessary to place the laminate in a battery container, injecting the electrolyte solution into the battery container, and sealing the battery container. In order to prevent pressure increase inside the secondary battery and occurrence of overcharging or overdischarging, an overcurrent preventing device such as a fuse or a PTC device; an expanded metal; or a lead plate may be provided as necessary. The shape of the secondary battery may be a coin type, button type, sheet type, cylinder type, prismatic type, flat type, or the like.

Examples

The following provides a more specific description of the present disclosure based on examples. However, the present disclosure is not limited to the following examples. In the following description, "%" and "parts" used in expressing quantities are by mass, unless otherwise specified.

Moreover, in the case of a polymer that is produced through copolymerization of a plurality of types of monomers, the proportion in the polymer constituted by a monomer unit that is formed through polymerization of a given monomer is normally, unless otherwise specified, the same as the ratio (charging ratio) of the given monomer among all monomers used in polymerization of the polymer.

In the examples and comparative examples, the following methods were used to evaluate the weight-average molecular weight of a polymer, the viscosity change rate of a binder composition, the viscosity stability of a slurry composition, the electrolyte solution resistance of an electrode mixed material layer, and the battery resistance and cycle characteristics of a secondary battery.

<Weight-Average Molecular Weight>

The weight-average molecular weight of a polymer was measured by gel permeation chromatography (GPC) using tetrahydrofuran (THF) as the mobile phase (developing solvent).

Specifically, an N-methylpyrrolidone (NMP) solution of a measurement target polymer was diluted to a polymer concentration of 0.5 mass % with THF and was then filtered using a polytetrafluoroethylene (PTFE) filter having a pore diameter of 0.5 μm to obtain a measurement sample. The obtained measurement sample was passed through a GPC column (TSK-gel SuperHM-H produced by Tosoh Corporation) at a flow rate of 0.6 mL/min, and the weight-average molecular weight was calculated from a first peak.

<Viscosity Change Rate>

The viscosity M0 of a produced binder composition after the binder composition had been stirred (redispersed) for 1 minute under conditions of a temperature of 25° C. and a stirring speed of 2,000 rpm using a planetary centrifugal mixer (Thinky Mixer ARE-310 produced by Thinky Corporation) and the viscosity M1 of the binder composition after the binder composition had been stored (left at rest) at 60° C. for 30 days were measured. Viscosity measurement was performed by a B-type viscometer under conditions of a temperature of 25° C., a No. 4 rotor, and a rotor speed of 60 rpm. Note that the binder composition serving as a measurement target for the viscosity M0 was a composition that had not been stored at a temperature of 60° C. or higher prior to measurement.

The viscosity change rate $\Delta M$ ($=\{(M1-M0)/M0\}\times 100$ (%)) was calculated. A smaller value for the viscosity change rate $\Delta M$ indicates that the binder composition has higher viscosity stability.

<Viscosity Stability>

A slurry composition was loaded into a case of 30 mL in capacity straight after production thereof and was stored while being rolled by a MIX ROTOR for 1 day under conditions of a temperature of 25° C. and a rotation speed of 60 rpm. The viscosity of the slurry composition after storage was measured. Note that viscosity measurement was performed by a B-type viscometer under conditions of a temperature of 25° C., a No. 4 rotor, and a rotor speed of 60 rpm.

A viscosity ratio ($=(E60/S60)\times 100\%$) was calculated by dividing the post-storage viscosity (E60) by the pre-storage viscosity (S60) and was evaluated by the following standard. A viscosity ratio closer to 100% indicates higher slurry viscosity stability.

A: Viscosity ratio of not less than 80% and less than 120%
B: Viscosity ratio of not less than 70% and less than 80% or of not less than 120% and less than 150%
C: Viscosity ratio of not less than 50% and less than 70% or of not less than 150% and less than 200%
D: Viscosity ratio of less than 50% or of 200% or more <Electrolyte Solution Resistance>

A binder composition was dried at 120° C. for 12 hours in a Teflon® (Teflon is a registered trademark in Japan, other countries, or both) petri dish to obtain a film of 1 mm in thickness. The film was punched with a circular shape of 1.6 mm in diameter to obtain a measurement sample (simulated electrode mixed material layer), and the weight W0 of the measurement sample was measured.

The obtained measurement sample was stored in 60° C. electrolyte solution for 144 hours and was subsequently washed with methanol. The weight W1 of the washed measurement sample was measured.

Note that the electrolyte solution was obtained by dissolving $LiPF_6$ of 1 mol/L in concentration in a mixed solvent obtained by mixing ethylene carbonate (EC), propylene carbonate (PC), ethyl methyl carbonate (EMC), and propyl propionate (PP) in a mass ratio of EC:PC:EMC:PP=2:1:1:6, and by adding 1.5 volume % of vinylene carbonate as an additive.

The proportion of non-eluted content $\Delta W$ ($=(W1/W0)\times 100(\%)$) was calculated and was evaluated by the following standard. A larger value for the proportion of non-eluted content $\Delta W$ indicates that an electrode mixed material layer obtained using the binder composition has higher electrolyte solution resistance.

A: Proportion of non-eluted content $\Delta W$ of 85% or more
B: Proportion of non-eluted content $\Delta W$ of not less than 70% and less than 85%
C: Proportion of non-eluted content $\Delta W$ of not less than 55% and less than 70%
D: Proportion of non-eluted content $\Delta W$ of less than 55%

<Battery Resistance (Initial Resistance)>

A produced secondary battery was constant-current charged to a battery voltage of 4.35 V at 0.2 CmA and was then constant-voltage charged to a charging current of 0.02 CmA at 4.35 V. Next, the secondary battery was constant-current discharged to a battery voltage of 3.87 V (state of charge (SOC): 50%) at 0.2 CmA. Thereafter, the voltage change after 30 seconds of discharging was measured at each of 0.2 CmA, 0.5 CmA, 1.0 CmA, 2.0 CmA, 2.5 CmA, and 3.0 CmA. A plot of each of the discharge currents and the measured voltage changes was prepared (horizontal axis: value of discharge current; vertical axis: value of voltage change), and the gradient of this plot was taken to be a resistance value (Q). The calculated resistance value was evaluated by the following standard. A lower resistance value indicates that the secondary battery has less internal resistance and that battery resistance is lower.

A: Resistance value of less than 4Ω
B: Resistance value of not less than 4Ω and less than 5Ω
C: Resistance value of not less than 5Ω and less than 6Ω
D: Resistance value of 6Ω or more <Cycle Characteristics (High-Potential Cycle Characteristics)>

A produced secondary battery was subjected to 100 cycles of an operation of charging to a battery voltage of 4.5 V with a 1 C constant current and discharging to a battery voltage of 3 V with a 1 C constant current in a 45° C. environment. A ratio of the discharge capacity of the $100^{th}$ cycle relative to the discharge capacity of the $1^{st}$ cycle (charge/discharge capacity retention rate=(discharge capacity of $100^{th}$ cycle/discharge capacity of $1^{st}$ cycle)×100%) was determined and was evaluated in accordance with the following standard. A higher charge/discharge capacity retention rate indicates higher durability under repeated exposure to high electric potential and better cycle characteristics.

A: Charge/discharge capacity retention rate of 80% or more
B: Charge/discharge capacity retention rate of not less than 75% and less than 80%
C: Charge/discharge capacity retention rate of not less than 70% and less than 75%
D: Charge/discharge capacity retention rate of less than 70%

Example 1

<Production of Polymer>

An autoclave equipped with a stirrer was charged with 164 parts of deionized water, 5.0 parts of methacrylic acid as a bondable functional group-containing monomer, 63.0 parts of 2-ethylhexyl acrylate as a (meth)acrylic acid ester monomer, 27.0 parts of styrene as an aromatic vinyl monomer, 5.0 parts of acrylonitrile as a nitrile group-containing monomer, 0.3 parts of potassium persulfate as a polymerization initiator, 1.2 parts of sodium polyoxyethylene alkyl ether sulfate as an emulsifier, and 0.3 parts of tert-dodecyl mercaptan as a molecular weight modifier. These materials were sufficiently stirred and were then heated at 80° C. for 3 hours to carry out polymerization to yield a water dispersion of a polymer. The polymerization conversion rate was calculated to be 96% from the solid content concentration. Next, NMP as a solvent was added to the obtained water dispersion of the polymer such that the solid content concentration of the polymer was adjusted to 7%. Vacuum evaporation was performed at 90° C. so as to remove water and excess NMP to obtain an NMP solution of the polymer (solid content concentration: 8%).

The weight-average molecular weight of the obtained polymer was measured. The result is shown in Table 1.

<Preparation of Polyvalent Cationic Organic Compound (B)>

Polyethyleneimine (produced by Nippon Shokubai Co., Ltd.) having an amine value of 21 mmol/g and a weight-average molecular weight of 300 was prepared as a polyvalent cationic organic compound (B). In addition, an NMP solution of the polyethyleneimine (PEI) (solid content concentration: 8%) was produced.

<Production of Binder Composition for Positive Electrode>

A binder composition for a positive electrode was obtained by mixing the NMP solution of the polymer and the NMP solution of polyethyleneimine described above such that the mixing ratio in terms of solid content (polymer: polyethyleneimine) was 95:5.

The obtained binder composition for a positive electrode was used to evaluate electrolyte solution resistance and the viscosity change rate. The results are shown in Table 1.

<Production of Slurry Composition for Positive Electrode>

A slurry composition for a positive electrode was produced by mixing 100 parts of lithium cobalt oxide ($LiCoO_2$; volume-average particle diameter: 12 μm) as a positive electrode active material, 1.5 parts of Ketjenblack (produced by Lion Specialty Chemicals Co., Ltd.; specialty oil furnace carbon powdered product; number-average particle diameter: 40 nm; specific surface area: 800 $m^2/g$) as a conductive material, an amount of the binder composition for a positive electrode such that the amount of the polymer was 0.6 parts (in terms of solid content), 0.6 parts (in terms of solid content) of an NMP solution of polyvinylidene fluoride (PVDF) as a binder, and NMP as additional solvent in a planetary mixer. The amount of additional NMP was adjusted such that the viscosity of the obtained slurry composition for a positive electrode (measured by a B-type viscometer; temperature: 25° C.; rotor: No. 4; rotor speed: 60 rpm) was within a range of 5,000±200 mPa·s.

Viscosity stability of the obtained slurry composition for a positive electrode was evaluated. The result is shown in Table 1.

<Production of Positive Electrode>

The obtained slurry composition for a positive electrode was applied onto one side of a current collector formed of aluminum foil of 15 μm in thickness such that the coating weight of the slurry composition for a positive electrode after drying was 20 $mg/cm^2$. The applied slurry composition was dried at 90° C. for 20 minutes and at 120° C. for 20 minutes, and then 2 hours of heat treatment was performed at 150° C. to obtain a positive electrode web. The obtained positive electrode web was rolled by roll pressing to obtain a positive electrode including a positive electrode mixed material layer of 3.7 $g/cm^3$ in density on the aluminum foil (current collector).

<Production of Negative Electrode>

A slurry composition for a negative electrode was produced by mixing 100 parts of spherical artificial graphite (volume-average particle diameter: 12 μm) as a negative electrode active material, 1 part of a styrene-butadiene copolymer as a binder, 1 part of carboxymethyl cellulose as a thickener, and an appropriate amount of water as a dispersion medium in a planetary mixer.

The obtained slurry composition for a negative electrode was applied onto one side of a current collector formed of copper foil of 15 μm in thickness such that the coating weight of the slurry composition for a negative electrode after drying was 10 $mg/cm^2$. The applied slurry composition was dried at 60° C. for 20 minutes and at 120° C. for 20 minutes to obtain a negative electrode web. The obtained negative electrode web was rolled by roll pressing to obtain a negative electrode including a negative electrode mixed material layer of 1.5 $g/cm^3$ in density on the copper foil (current collector).

<Preparation of Separator>

A separator made from a single layer of polypropylene (width: 65 mm; length: 500 mm; thickness: 25 μm; produced by a dry method; porosity: 55%) was cut out as a square of 4.4 cm×4.4 cm.

<Production of Secondary Battery>

An aluminum packing case was prepared as a battery case. The positive electrode obtained as described above was cut out as a 4 cm×4 cm square and was positioned with the surface at the current collector side of the positive electrode in contact with the aluminum packing case. The square separator obtained as described above was positioned on the positive electrode mixed material layer of the positive electrode. In addition, the negative electrode obtained as described above was cut out as a 4.2 cm×4.2 cm square and was positioned on the separator such that the surface at the negative electrode mixed material layer side of the negative electrode faced the separator. The aluminum packing case was filled with electrolyte solution and was then closed by heat sealing at 150° C. so as to seal an opening of the aluminum packing case and thereby obtain a lithium ion secondary battery. Note that the electrolyte solution was obtained by dissolving $LiPF_6$ of 1 mol/L in concentration in a mixed solvent obtained by mixing ethylene carbonate (EC), propylene carbonate (PC), ethyl methyl carbonate (EMC), and propyl propionate (PP) in a mass ratio of EC:PC:EMC:PP=2:1:1:6, and by adding 1.5 volume % of vinylene carbonate as an additive.

The obtained lithium ion secondary battery was used to evaluate battery resistance and cycle characteristics. The results are shown in Table 1.

Example 2

A polymer, a polyvalent cationic organic compound (B), a binder composition for a positive electrode, a slurry composition for a positive electrode, a positive electrode, a negative electrode, a separator, and a secondary battery were prepared or produced in the same way as in Example 1 with the exception that the amount of tert-dodecyl mercaptan was changed to 0.1 parts in production of the polymer. Various evaluations were conducted in the same manner as in Example 1. The results are shown in Table 1.

Example 3

A polymer, a polyvalent cationic organic compound (B), a binder composition for a positive electrode, a slurry composition for a positive electrode, a positive electrode, a negative electrode, a separator, and a secondary battery were prepared or produced in the same way as in Example 1 with the exception that the amount of 2-ethylhexyl acrylate was changed to 42.0 parts, the amount of styrene was changed to 38.0 parts, and the amount of acrylonitrile was changed to 15.0 parts in production of the polymer. Various evaluations were conducted in the same manner as in Example 1. The results are shown in Table 1.

Example 4

A polymer, a polyvalent cationic organic compound (B), a binder composition for a positive electrode, a slurry composition for a positive electrode, a positive electrode, a negative electrode, a separator, and a secondary battery were prepared or produced in the same way as in Example 1 with the exception that the amount of 2-ethylhexyl acrylate was changed to 75.0 parts, the amount of styrene was changed to 20.0 parts, and acrylonitrile was not used in production of the polymer. Various evaluations were conducted in the same manner as in Example 1. The results are shown in Table 1.

Example 5

A polymer, a polyvalent cationic organic compound (B), a binder composition for a positive electrode, a slurry composition for a positive electrode, a positive electrode, a negative electrode, a separator, and a secondary battery were prepared or produced in the same way as in Example 1 with the exception that the amount of methacrylic acid was changed to 1.0 parts, the amount of 2-ethylhexyl acrylate was changed to 66.0 parts, the amount of styrene was changed to 33.0 parts, and acrylonitrile was not used in production of the polymer. Various evaluations were conducted in the same manner as in Example 1. The results are shown in Table 1.

Example 6

A polymer, a polyvalent cationic organic compound (B), a binder composition for a positive electrode, a slurry composition for a positive electrode, a positive electrode, a negative electrode, a separator, and a secondary battery were prepared or produced in the same way as in Example 1 with the exception that the amount of methacrylic acid was changed to 8.0 parts and the amount of 2-ethylhexyl acrylate was changed to 60.0 parts in production of the polymer. Various evaluations were conducted in the same manner as in Example 1. The results are shown in Table 1.

Example 7

A polymer, a polyvalent cationic organic compound (B), a binder composition for a positive electrode, a slurry composition for a positive electrode, a positive electrode, a negative electrode, a separator, and a secondary battery were prepared or produced in the same way as in Example 1 with the exception that polyethyleneimine (produced by Nippon Shokubai Co., Ltd.) having an amine value of 20 mmol/g and a weight-average molecular weight of 600 was prepared and used as the polyvalent cationic organic compound (B). Various evaluations were conducted in the same manner as in Example 1. The results are shown in Table 1.

Example 8

A polymer, a polyvalent cationic organic compound (B), a binder composition for a positive electrode, a slurry composition for a positive electrode, a positive electrode, a negative electrode, a separator, and a secondary battery were prepared or produced in the same way as in Example 1 with the exception that the NMP solution of the polymer and the NMP solution of polyethyleneimine were mixed such that the mixing ratio in terms of solid content (polymer:polyethyleneimine) was 80:20 in production of the binder composition for a positive electrode. Various evaluations were conducted in the same manner as in Example 1. The results are shown in Table 1.

Example 9

A polymer, a polyvalent cationic organic compound (B), a binder composition for a positive electrode, a slurry composition for a positive electrode, a positive electrode, a negative electrode, a separator, and a secondary battery were prepared or produced in the same way as in Example 1 with the exception that hexamethylenediamine carbamate (molecular weight: 164) was prepared and used as the polyvalent cationic organic compound (B). Various evaluations were conducted in the same manner as in Example 1. The results are shown in Table 1.

Example 10

A polymer, a polyvalent cationic organic compound (B), a binder composition for a positive electrode, a slurry composition for a positive electrode, a positive electrode, a negative electrode, a separator, and a secondary battery were prepared or produced in the same way as in Example 1 with the exception that N,N'-dicinnamylidene-1,6-hexanediamine (molecular weight: 345) was prepared and used as the polyvalent cationic organic compound (B). Various evaluations were conducted in the same manner as in Example 1. The results are shown in Table 1.

Example 11

A polymer, a polyvalent cationic organic compound (B), a binder composition for a positive electrode, a slurry composition for a positive electrode, a positive electrode, a negative electrode, a separator, and a secondary battery were prepared or produced in the same way as in Example 1 with the exception that butyl acrylate was prepared and used as the (meth)acrylic acid ester monomer. Various evaluations were conducted in the same manner as in Example 1. The results are shown in Table 1.

Comparative Example 1

A polymer, a polyvalent cationic organic compound (B), a binder composition for a positive electrode, a slurry composition for a positive electrode, a positive electrode, a negative electrode, a separator, and a secondary battery were prepared or produced in the same way as in Example 1 with the exception that tert-dodecyl mercaptan was not used in production of the polymer, and polyethyleneimine (produced by Nippon Shokubai Co., Ltd.) having an amine value of 19 mmol/g and a weight-average molecular weight of 1,200 was prepared and used as the polyvalent cationic organic compound (B). Various evaluations were conducted in the same manner as in Example 1. The results are shown in Table 1.

Comparative Example 2

A polymer, a polyvalent cationic organic compound (B), a binder composition for a positive electrode, a slurry composition for a positive electrode, a positive electrode, a negative electrode, a separator, and a secondary battery were prepared or produced in the same way as in Example 1 with the exception that 63.0 parts of 1,3-butadiene was used as a conjugated diene monomer instead of 2-ethylhexyl acrylate and the amount of tert-dodecyl mercaptan was changed to 1.5 parts in production of the polymer. Various evaluations were conducted in the same manner as in Example 1. The results are shown in Table 1.

Comparative Example 3

A polymer, a polyvalent cationic organic compound (B), a binder composition for a positive electrode, a slurry composition for a positive electrode, a positive electrode, a negative electrode, a separator, and a secondary battery were prepared or produced in the same way as in Example 1 with the exception that methacrylic acid was not used and the amount of styrene was changed to 32.0 parts in production of the polymer. Various evaluations were conducted in the same manner as in Example 1. The results are shown in Table 1.

Comparative Example 4

A polymer, a binder composition for a positive electrode, a slurry composition for a positive electrode, a positive electrode, a negative electrode, a separator, and a secondary battery were prepared or produced in the same way as in Example 1 with the exception that the NMP solution of the polymer was used in that form as the binder composition for a positive electrode without using a polyvalent cationic organic compound (B) in production of the binder composition for a positive electrode. Various evaluations were conducted in the same manner as in Example 1. The results are shown in Table 1.

Comparative Example 5

A polymer, a polyvalent cationic organic compound (B), a binder composition for a positive electrode, a slurry composition for a positive electrode, a positive electrode, a negative electrode, a separator, and a secondary battery were prepared or produced in the same way as in Example 1 with the exception that the NMP solution of the polymer and the NMP solution of polyethyleneimine were mixed such that the mixing ratio in terms of solid content (polymer:polyethyleneimine) was 70:30 in production of the binder composition for a positive electrode. Various evaluations were conducted in the same manner as in Example 1. The results are shown in Table 1.

Comparative Example 6

A polymer, a polyvalent cationic organic compound (B), a binder composition for a positive electrode, a slurry composition for a positive electrode, a positive electrode, a negative electrode, a separator, and a secondary battery were prepared or produced in the same way as in Example 1 with the exception that the amount of methacrylic acid was changed to 1.0 parts, the amount of 2-ethylhexyl acrylate was changed to 56.0 parts, the amount of styrene was changed to 38.0 parts, and tert-dodecyl mercaptan was not used in production of the polymer, and polyethyleneimine (produced by Nippon Shokubai Co., Ltd.) having an amine value of 19 mmol/g and a weight-average molecular weight of 1,200 was prepared and used as the polyvalent cationic organic compound (B). Various evaluations were conducted in the same manner as in Example 1. The results are shown in Table 1.

Comparative Example 7

A polymer, a polyvalent cationic organic compound (B), a binder composition for a positive electrode, a slurry composition for a positive electrode, a positive electrode, a negative electrode, a separator, and a secondary battery were prepared or produced in the same way as in Example 1 with the exception that, in production of the polymer, a metal bottle was charged with 25 parts of sodium dodecylbenzenesulfonate aqueous solution of 10% in concentration, 1.0 parts of methacrylic acid, 35.0 parts of acrylonitrile, and 0.5 parts of tert-dodecyl mercaptan as a molecular weight modifier, gas inside the metal bottle was purged with nitrogen three times, 64.0 parts of 1,3-butadiene was subsequently added as a conjugated diene monomer, the metal bottle was held at 5° C. while adding 0.1 parts of cumene hydroperoxide as a polymerization initiator, polymerization was carried out for 16 hours while rotating the metal bottle, 0.1 parts of hydroquinone aqueous solution of 10% in concentration was subsequently added as a polymerization inhibitor to terminate the polymerization reaction, and then residual monomer was removed using a rotary evaporator having a water temperature of 60° C. to obtain a water dispersion of a polymer (solid content concentration: 30 mass %), and polyethyleneimine (produced by Nippon Shokubai Co., Ltd.) having an amine value of 19 mmol/g and a weight-average molecular weight of 1,200 was prepared and used as the polyvalent cationic organic compound (B). Various evaluations were conducted in the same manner as in Example 1. The results are shown in Table 1.

TABLE 1

| | | | | Example 1 | Example 2 | Example 3 | Example 4 | Example 5 | Example 6 |
|---|---|---|---|---|---|---|---|---|---|
| Binder composition | Polymer | Chemical composition | Methacrylic acid unit [mass %] | 5.0 | 5.0 | 5.0 | 5.0 | 1.0 | 8.0 |
| | | | 2-Ethylhexyl acrylate unit [mass %] | 63.0 | 63.0 | 42.0 | 75.0 | 66.0 | 60.0 |
| | | | Butyl acrylate unit [mass %] | | | | | | |
| | | | Styrene unit [mass %] | 27.0 | 27.0 | 38.0 | 20.0 | 33.0 | 27.0 |
| | | | Acrylonitrile unit [mass %] | 5.0 | 5.0 | 15.0 | — | — | 5.0 |
| | | | 1,3-Butadiene unit [mass %] | — | — | — | — | — | — |
| | | | Weight-average molecular weight [—] | 100,000 | 200,000 | 110,000 | 110,000 | 110,000 | 100,000 |
| | Polyethyleneimine | | Weight-average molecular weight [—] | 300 | 300 | 300 | 300 | 300 | 300 |
| | Hexamethylenediamine carbamate | | Molecular weight [—] | | | | | | |
| | N,N'-Dicinnamylidene-1,6-hexanediamine | | Molecular weight [—] | | | | | | |
| | Mixing ratio (polymer/polyvalent cationic organic compound) [—] | | | 95/5 | 95/5 | 95/5 | 95/5 | 95/5 | 95/5 |
| | Viscosity change rate (60° C., 30 days) [%] | | | 40 | 350 | 30 | 40 | 10 | 270 |

TABLE 1-continued

| | | | | | | | | |
|---|---|---|---|---|---|---|---|---|
| Evaluation | Electrolyte solution resistance | | | A | A | C | A | B | A |
| | Viscosity stability | | | A | C | A | B | B | C |
| | Battery resistance | | | A | C | A | B | B | C |
| | Cycle characteristics | | | A | C | C | B | C | C |

| | | | | Example 7 | Example 8 | Example 9 | Example 10 | Example 11 | Comparative Example 1 |
|---|---|---|---|---|---|---|---|---|---|
| Binder composition | Polymer | Chemical composition | Methacrylic acid unit [mass %] | 5.0 | 5.0 | 5.0 | 5.0 | 5.0 | 5.0 |
| | | | 2-Ethylhexyl acrylate unit [mass %] | 63.0 | 63.0 | 63.0 | 63.0 | | 63.0 |
| | | | Butyl acrylate unit [mass %] | | | | | 63.0 | |
| | | | Styrene unit [mass %] | 27.0 | 27.0 | 27.0 | 27.0 | 27.0 | 27.0 |
| | | | Acrylonitrile unit [mass %] | 5.0 | 5.0 | 5.0 | 5.0 | 5.0 | 5.0 |
| | | | 1,3-Butadiene unit [mass %] | — | — | — | — | — | — |
| | | Weight-average molecular weight [—] | | 100,000 | 100,000 | 100,000 | 100,000 | 100,000 | 430,000 |
| | Polyethyleneimine | Weight-average molecular weight [—] | | 600 | 300 | | | 300 | 1200 |
| | Hexamethylenediamine carbamate | Molecular weight [—] | | | | 164 | | | |
| | N,N'-Dicinnamylidene-1,6-hexanediamine | Molecular weight [—] | | | | | 345 | | |
| | Mixing ratio (polymer/polyvalent cationic organic compound) [—] | | | 95/5 | 80/20 | 95/5 | 95/5 | 95/5 | 95/5 |
| | Viscosity change rate (60° C., 30 days) [%] | | | 170 | 170 | 20 | 30 | 30 | 800 |
| Evaluation | Electrolyte solution resistance | | | A | A | C | B | B | A |
| | Viscosity stability | | | B | B | A | A | A | D |
| | Battery resistance | | | B | B | C | B | B | D |
| | Cycle characteristics | | | B | B | C | B | B | D |

| | | | | Comparative Example 2 | Comparative Example 3 | Comparative Example 4 | Comparative Example 5 | Comparative Example 6 | Comparative Example 7 |
|---|---|---|---|---|---|---|---|---|---|
| Binder composition | Polymer | Chemical composition | Methacrylic acid unit [mass %] | 5.0 | — | 5.0 | 5.0 | 1.0 | 1.0 |
| | | | 2-Ethylhexyl acrylate unit [mass %] | — | 63.0 | 63.0 | 63.0 | 56.0 | — |
| | | | Butyl acrylate unit [mass %] | | | | | | |
| | | | Styrene unit [mass %] | 27.0 | 32.0 | 27.0 | 27.0 | 38.0 | — |
| | | | Acrylonitrile unit [mass %] | 5.0 | 5.0 | 5.0 | 5.0 | 5.0 | 35.0 |
| | | | 1,3-Butadiene unit [mass %] | 63.0 | — | — | — | — | 64.0 |
| | | Weight-average molecular weight [—] | | 90,000 | 100,000 | 100,000 | 100,000 | 400,000 | 350,000 |
| | Polyethyleneimine | Weight-average molecular weight [—] | | 300 | 300 | — | 300 | 1200 | 1200 |
| | Hexamethylenediamine carbamate | Molecular weight [—] | | | | | | | |
| | N,N'-Dicinnamylidene-1,6-hexanediamine | Molecular weight [—] | | | | | | | |
| | Mixing ratio (polymer/polyvalent cationic organic compound) [—] | | | 95/5 | 95/5 | 100/0 | 70/30 | 95/5 | 95/5 |
| | Viscosity change rate (60° C., 30 days) [%] | | | 60 | 0 | 0 | 420 | 550 | 620 |
| Evaluation | Electrolyte solution resistance | | | A | C | C | A | A | A |
| | Viscosity stability | | | A | D | D | D | D | D |
| | Battery resistance | | | A | D | D | D | D | D |
| | Cycle characteristics | | | D | D | D | D | D | D |

It can be seen from Table 1 that a slurry composition having excellent viscosity stability and a secondary battery having excellent cycle characteristics were obtained in each of Examples 1 to 8. It can also be seen from Table 1 that viscosity stability of a slurry composition decreased and cycle characteristics of a secondary battery deteriorated in Comparative Examples 1 and 5 to 7 in which the viscosity change rate of the binder composition was too large. Moreover, cycle characteristics of a secondary battery deteriorated in Comparative Examples 2 and 7 in which a polymer that did not include a (meth)acrylic acid ester monomer unit was used. Furthermore, electrolyte solution resistance of an electrode mixed material layer decreased, viscosity stability of a slurry composition decreased, and cycle characteristics of a secondary battery deteriorated in Comparative Example 3 in which a polymer that did not include a monomer unit including a functional group bondable with a cationic group was used and Comparative Example 4 in which a polyvalent cationic organic compound (B) was not used.

INDUSTRIAL APPLICABILITY

According to the present disclosure, a binder composition for a non-aqueous secondary battery electrode and a conductive material paste composition for a non-aqueous secondary battery electrode that can form a slurry composition for a non-aqueous secondary battery electrode having excellent viscosity stability and a non-aqueous secondary battery having excellent cycle characteristics are obtained.

Moreover, according to the present disclosure, a slurry composition for a non-aqueous secondary battery electrode that has excellent viscosity stability and that can form a non-aqueous secondary battery having excellent cycle characteristics is obtained.

Furthermore, according to the present disclosure, an electrode for a non-aqueous secondary battery that can form a non-aqueous secondary battery having excellent cycle characteristics and a non-aqueous secondary battery that has excellent cycle characteristics are obtained.

The invention claimed is:

1. A binder composition for a non-aqueous secondary battery electrode comprising:
    a polymer that includes a monomer unit including a functional group that is bondable with a cationic group and a (meth)acrylic acid ester monomer unit; and
    an organic compound that includes at least two cationic groups, wherein
    the organic compound has a molecular weight of not less than 200 and not more than 600;
    the polymer has a weight-average molecular weight of 100,000 or more and 250,000 or less;
    the polymer and the organic compound are mixed in a mixing ratio of 80:20 to 95:5;
    the binder composition for a non-aqueous secondary battery electrode has a viscosity change rate of 400% or less when left at rest at a temperature of 60° C. for 30 days; and
    the polymer includes the monomer unit including a functional group that is bondable with a cationic group in a proportion of not less than 0.1 mass % and not more than 10 mass %.

2. The binder composition for a non-aqueous secondary battery electrode according to claim 1, wherein the polymer further includes an aromatic vinyl monomer unit.

3. The binder composition for a non-aqueous secondary battery electrode according to claim 2, wherein the polymer includes the aromatic vinyl monomer unit in a proportion of not less than 20 mass % and not more than 40 mass %.

4. The binder composition for a non-aqueous secondary battery electrode according to claim 1, wherein the polymer includes the (meth)acrylic acid ester monomer unit in a proportion of not less than 40 mass % and not more than 80 mass %.

5. The binder composition for a non-aqueous secondary battery electrode according to claim 1, wherein the cationic groups included in the organic compound are unsubstituted amino groups.

6. A conductive material paste composition for a non-aqueous secondary battery electrode comprising: a conductive material; and the binder composition for a non-aqueous secondary battery electrode according to claim 1.

7. A slurry composition for a non-aqueous secondary battery electrode comprising: an electrode active material; and the binder composition for a non-aqueous secondary battery electrode according to claim 1.

8. An electrode for a non-aqueous secondary battery comprising an electrode mixed material layer formed using the slurry composition for a non-aqueous secondary battery electrode according to claim 7.

9. A non-aqueous secondary battery comprising a positive electrode, a negative electrode, an electrolyte solution, and a separator, wherein
    at least one of the positive electrode and the negative electrode is the electrode for a non-aqueous secondary battery according to claim 8.

* * * * *